(12) United States Patent
Poledna

(10) Patent No.: US 9,575,859 B2
(45) Date of Patent: Feb. 21, 2017

(54) METHOD FOR FAULT RECOGNITION IN A SYSTEM OF SYSTEMS

(71) Applicant: FTS Computertechnik GmbH, Vienna (AT)

(72) Inventor: Stefan Poledna, Klosterneuburg (AT)

(73) Assignee: FTS Computertechnik GmbH, Vienna (AT)

( * ) Notice: Subject to any disclaimer, the term of this patent is extended or adjusted under 35 U.S.C. 154(b) by 295 days.

(21) Appl. No.: 14/380,048

(22) PCT Filed: Feb. 20, 2013

(86) PCT No.: PCT/AT2013/050043
§ 371 (c)(1),
(2) Date: Aug. 20, 2014

(87) PCT Pub. No.: WO2013/123543
PCT Pub. Date: Aug. 29, 2013

(65) Prior Publication Data
US 2015/0012779 A1 Jan. 8, 2015

(30) Foreign Application Priority Data

Feb. 22, 2012 (AT) .................................. A 227/2012

(51) Int. Cl.
*G06F 11/00* (2006.01)
*G06F 11/22* (2006.01)
(Continued)

(52) U.S. Cl.
CPC ...... *G06F 11/2294* (2013.01); *G06F 11/0709* (2013.01); *G06F 11/0784* (2013.01); *G06F 11/1629* (2013.01); *G06F 2201/805* (2013.01)

(58) Field of Classification Search
CPC ............. G06F 11/2294; G06F 11/0709; G06F 11/0784; G06F 11/1629; G06F 11/07;
(Continued)

(56) References Cited

U.S. PATENT DOCUMENTS 5,694,542 A * 12/1997 Kopetz .................... G06F 11/10
714/47.1
5,793,753 A    8/1998 Hershey et al.
(Continued)

FOREIGN PATENT DOCUMENTS

EP       246218 A2    11/1987
WO     0231656 A2     4/2002
(Continued)

OTHER PUBLICATIONS

Kopetz, Hermann, and Günter Grunsteidl. "TTP—A time-triggered protocol for fault-tolerant real-time systems." In Fault-Tolerant Computing, 1993. FTCS-23. Digest of Papers., The Twenty-Third International Symposium on, pp. 524-533. IEEE, 1993.*
(Continued)

*Primary Examiner* — Michael Maskulinski
*Assistant Examiner* — Anthony J Amoroso
(74) *Attorney, Agent, or Firm* — KPPB LLP

(57) ABSTRACT

A method for fault recognition in a distributed real-time computer system comprising fault containment units (FCUs), which has a global timebase, wherein the fault containment units communicate by means of messages via at least one message distribution unit, wherein a commitment time is associated with a message formed by a fault containment unit, and wherein a message distribution unit that receives a message relays the message to one or more fault containment units operating in parallel, and wherein a processing fault containment unit (VFCU) does not transmit or use any of its results that are influenced by one or more of
(Continued)

Figure 1:
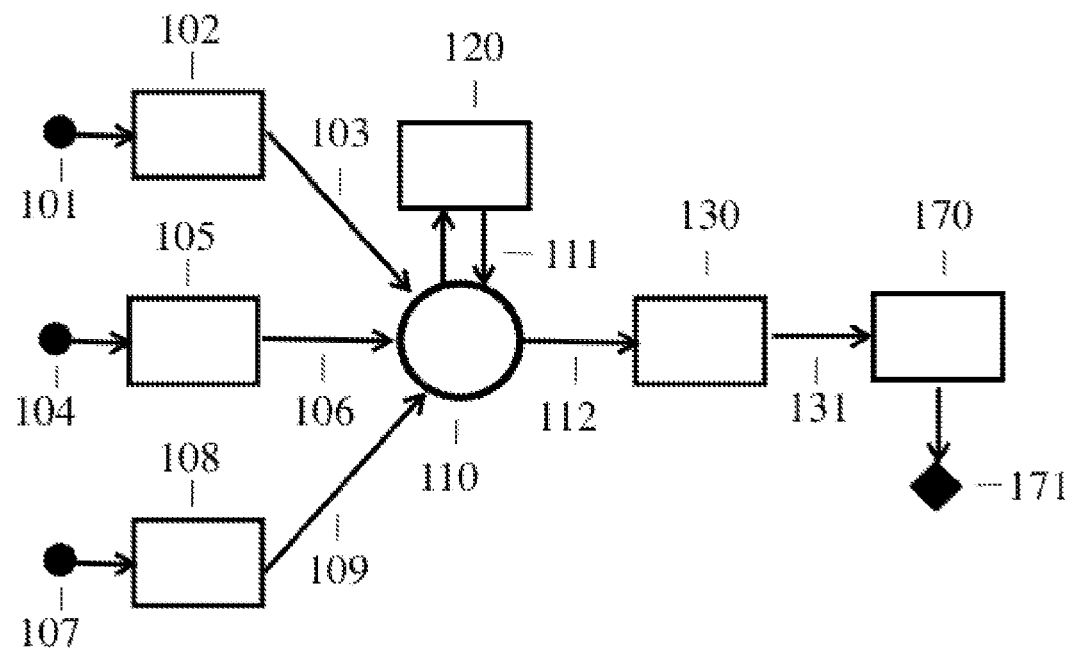

the received messages to the environment of the processing fault containment unit or before the commitment times associated with the received messages.

18 Claims, 1 Drawing Sheet

(51) Int. Cl.
*G06F 11/07* (2006.01)
*G06F 11/16* (2006.01)

(58) Field of Classification Search
CPC ............ G06F 11/0781; G06F 11/1633; G06F 11/1637; G06F 11/1641; G06F 11/165; G06F 11/1675; G06F 2201/805
See application file for complete search history.

(56) References Cited

U.S. PATENT DOCUMENTS

| | | |
|---|---|---|
| 7,839,868 B2 | 11/2010 | Kopetz |
| 8,004,993 B2 | 8/2011 | Angelow |
| 2005/0094674 A1 | 5/2005 | Zinke et al. |
| 2011/0307741 A1 | 12/2011 | Chen et al. |

FOREIGN PATENT DOCUMENTS

| | | |
|---|---|---|
| WO | 2009108978 A1 | 9/2009 |
| WO | 2011003121 A1 | 1/2011 |

OTHER PUBLICATIONS

H. Kopetz, "Fault containment and error detection in the time-triggered architecture," Autonomous Decentralized Systems, 2003. ISADS 2003. The Sixth International Symposium on, 2003, pp. 139-146.*
International Search Report for International Application No. PCT/AT2013/050043, Search completed Jun. 18, 2013, Mailed Jun. 27, 2013, 6 Pgs.
SAE Standard of TT Ethernet, Retrieved from: http://standards.sae.org/as6802/, Published Nov. 1, 2011.
Written Opinion for International Application No. PCT/AT2013/050043, Search completed Jun. 18, 2013, Mailed Jun. 27, 2013, 12 Pgs.
Kopetz, Hermann et al., "TTP—A Protocol for Fault-Tolerant Real-Time Systems," Computer, IEEE Service Center, vol. 27, No. 1, Jan. 1, 1994, pp. 14-23, XP000426338, DOI: 10.1109/2.248873.
Kopetz, Hermann, "Real-Time Systems Design Principles for Distributed Embedded Applications", Kluwer Academic Publishers, ISBN: 0-7923-9894-7, 1997, 4 Pages.

* cited by examiner

METHOD FOR FAULT RECOGNITION IN A SYSTEM OF SYSTEMS

The invention relates to a method for fault recognition in a distributed real-time computer system comprising fault containment units (FCUs), more particularly a fault-tolerant system of systems (SoS), having a global timebase.

The invention also relates to a distributed real-time computer system, more particularly a system of systems, comprising fault containment units.

The invention additionally relates to a message distribution unit for such a real-time computer system.

The present invention lies in the field of computer engineering. It describes an innovative method for parallelising the functional processing and the fault recognition in a distributed real-time computer system, more particularly in a system of systems, in order to improve the fault tolerance and to reduce the response time.

A distributed real-time computer system, in particular a system of systems (SoS), consisting of a multiplicity of autonomous sub-systems must recognise faults of sub-systems and tolerate these faults where possible. According to experience, the majority of causes of faults in an SoS are transient. A cause of a fault is referred to as transient if it only occurs temporarily and damages a data structure, but does not impair the future functionality of the hardware. Examples of transient causes of faults include neutrons from cosmic radiation, temporary interferences in the power supply or Heisenbugs [6, p. 138] in the software.

The first step in the fault treatment is fault recognition. A clear separation of the tasks of processing and fault recognition is necessary in order to guarantee the independence of the fault recognition from a faulty processing system. This independence is ensured when the processing and the fault recognition are performed in separate fault containment units (FCUs) (as described in detail in [6, p. 136]). An independent autonomous sub-system will be referred to hereinafter as an FCU.

In a large fault-tolerant SoS, a distinction is made between the following FCUs: (i) sensor FCUs (SFCU), which read data concerning the surrounding environment via sensors and pre-process this data, (ii) processing FCUs (VFCU), which combine the results of a number of sensor FCUs and process these results further, (iii) output FCUs (AFCU), which output data to the surrounding environment by means of actuators, and (iv) monitor FCUs (MFCU), which examine the results of the SFCUs, VFCUs and AFCUs in order to recognise faults. It is assumed that all FCUs can access a global timebase. The FCUs communicate via switching units exclusively by means of messages. A switching unit can convey an incoming message from a transmitter FCU to one or more receiver FCUs. The moment at which a message is conveyed is referred to as the conveying time of the message.

The object of the invention is to specify how the parallelisation of processing and fault recognition can be implemented in a real-time computer system, more particularly an SoS, with a simultaneous improvement of the response time behaviour.

More particularly, the object of the invention is to specify how the parallelisation of processing and fault recognition can be performed in a large real-time computer system, more particularly a large SoS, for example a cyclically operating distributed fault-tolerant SoS, with a simultaneous improvement of the response time behaviour.

This object is achieved with a method of the type mentioned in the introduction in that, in accordance with the invention, the fault containment units communicate by means of messages via at least one message distribution unit, wherein a commitment time is associated with a message formed by a fault containment unit, and wherein a message distribution unit that receives a message relays the message to one or more fault containment units operating in parallel, and wherein a processing fault containment unit (VFCU) does not transmit any of its results that are influenced by one or more of the received messages to the environment of the processing fault containment unit or use them for changing the inner state of the processing fault containment unit before the commitment times associated with the received messages.

The above-mentioned object is also achieved with a message distribution unit for conveying messages in a distributed real-time computer system, in particular a fault-tolerant system of systems (SoS), which comprises fault containment units (FCUs) and which has a global timebase, wherein the fault containment units communicate by means of messages via the at least one message distribution unit, wherein a commitment time is associated with a message formed by a fault containment unit, and wherein a message distribution unit that receives a message relays the message to one or more fault containment units operating in parallel, wherein, in accordance with the invention, the message distribution unit is designed to copy an incoming message and to transmit a copy of the message immediately to a monitor fault containment unit and to delay a second copy of the message until a commitment time associated with the message before the second copy of the message is transmitted from the message distribution unit to the following processing fault containment units.

In addition, this object is also achieved with a distributed real-time computer system, more particularly a fault-tolerant system of systems (SoS), which comprises fault containment units (FCUs) and which has a global timebase and at least one above-mentioned message distribution unit for conveying messages, wherein the fault containment units communicate by means of messages via the at least one message distribution unit, wherein a commitment time is associated with a message formed by a fault containment unit, and wherein a message distribution unit that receives a message relays the message to one or more fault containment units operating in parallel, and wherein, in accordance with the invention, the message distribution unit is designed to copy an incoming message and to transmit a copy of the message immediately to a monitor fault containment unit and to delay a second copy of the message until a commitment time associated with the message before the second copy of the message is transmitted from the message distribution unit to the following processing fault containment units.

It may be advantageous here if the commitment time associated with a message is contained in the message.

However, it may also be advantageous if the commitment time associated with a message is derived from the time-controlled time schedule, determined a priori, of the fault containment units.

It is expedient if a distinction is made between processing fault containment units (VFCUs) and monitor fault containment units (MFCUs), wherein the message distribution unit relays one or more messages of a sensor fault containment unit (SFCU) to one or more designated processing fault containment units and additionally to one or more monitor fault containment units, and wherein a monitor fault containment unit examines the content of the received messages and, if a fault is determined in a message, transmits a fault message to the one or more designated processing fault containment units before the commitment time associated with the message, such that the one or more designated processing fault containment units can reject all results influenced by the faulty message before the commitment time.

In a cyclically operating real-time computer system, in particular a cyclically operating system of systems, a designated processing fault containment unit advantageously replaces a result that is rejected in a cycle due to a fault with the result of the previous cycle.

In addition, a multiplicity of fault containment units, which may take over sensor data, may form messages in a cycle that have the same commitment time, wherein some or all of these messages are transmitted via one or more message distribution units to one or more processing fault containment units and to one or more monitor fault containment units, and wherein the processing fault containment units do not transmit any results that are influenced by one of these messages to the environment of a processing fault containment unit or use them for changing the inner state of a processing fault containment unit before the commitment time associated with the messages.

Furthermore, the distribution unit may relay received messages immediately to the monitor fault containment units, however the relay of the messages to the processing fault containment units is delayed until the commitment time, wherein, in the case of a recognised fault, the monitor fault containment units transmit a fault message to the distribution unit before the commitment time, such that the distribution unit can reject the faulty messages and does not relay them to the processing fault containment units.

In addition, it may be advantageous if the processing fault containment unit receiving a fault message decides, following analysis of the description of the fault contained in the fault message, whether the results will be transmitted in this cycle to the environment of the processing fault containment unit or will be used to permanently change the inner state of the processing fault containment unit.

The basic concept of the present invention lies in the fact that a commitment time is associated with a message transporting the result of an FCU for further processing in the following VFCU and said commitment time specifies when results calculated by the VFCU on the basis of the received message at the earliest may be output to the environment of the VFCU or written into the inner state of the VFCU. A message is transmitted virtually simultaneously at the conveying time to one or more VFCUs and MFCUs. In the interval between the conveyance time and the commitment time, the message is further processed by the VFCUs and is examined parallel thereto by the MFCU or the MFCUs. If an MFCU recognises a fault, a fault message is transmitted from the MFCU before the commitment time to the corresponding VFCUs, such that the VFCUs can reject the faulty results before the commitment time. A fault propagation into the environment or into the next processing cycle is thus prevented from occurring.

Each FCU is embedded in an area that receives messages from this FCU. The term "environment" of an FCU thus includes all receivers of messages of a given FCU.

It is assumed that each cycle starts with the reading of the sensor data by one or more SFCUs. Following pre-processing of the sensor data in the SFCUs, the results are relayed in the form of messages to one or more VFCUs, MFCUs and lastly AFCUs, which output the final results to the actuators. In each FCU a special data structure is managed in each cycle and contains all data transferred from one cycle to the following cycle. This data structure, which is defined at the end of each cycle, is referred to as the inner state of the FCU [6, p. 84]. A fault in the processing of an FCU can only be effective if faulty results are output by the FCU to the environment or if a faulty inner state is transferred to the following cycle of the FCU.

The independent provision of VFCUs and MFCUs is addressed in a number of patents, for example in [1], [3] and [5]. In these patents the MFCUs monitor the results of the VFCUs without immediately preventing a recognised fault in a VFCU from being effective in the environment of the VFCU. Due to the introduction of a commitment time and the delay of the output of a VFCU until this commitment time, the present invention makes it possible to prevent the propagation of a recognised fault into the environment of a VFCU.

Figure 2:
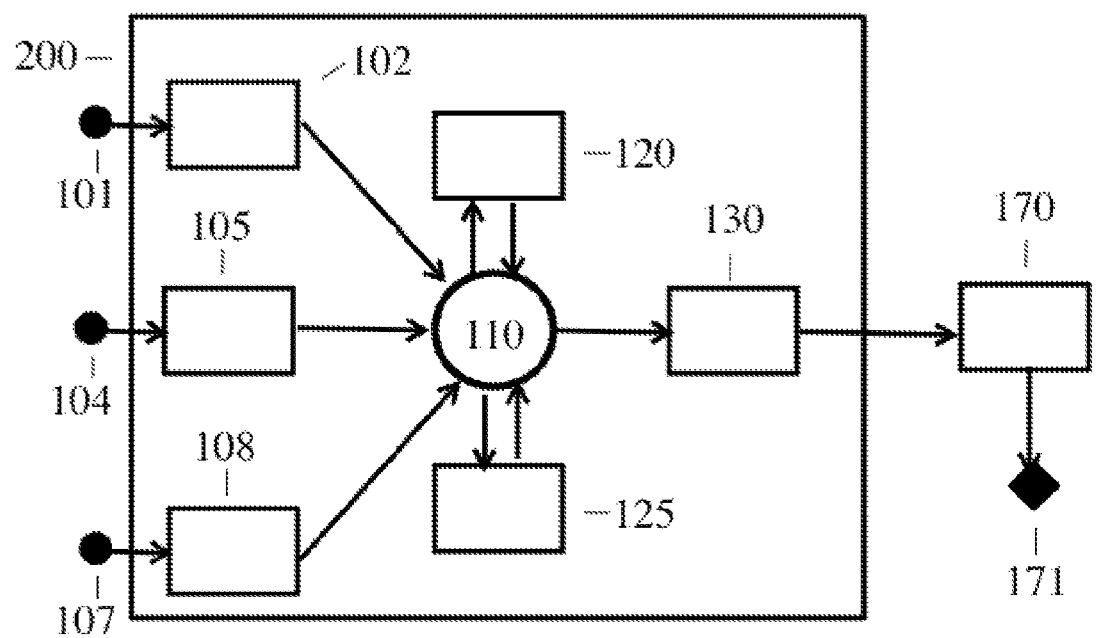

The invention will be explained in greater detail on the basis of the following, exemplary drawing, in which FIG. 1 shows an SoS with three sensor FCUs and a processing FCU, and FIG. 2 shows the provision of the system from FIG. 1 in a multiprocessor system on chip (MPSoC).

The following specific example concerns one of the many possible implementations of the new method.

FIG. 1 illustrates a time-controlled cyclical SoS with three sensors 101, 104, 107, an actuator 171, sensor FCUS (SF-CUs) 102, 105, 108, a monitor FCU (MFCU) 120, a processing FCU (VFCU) 130, an output FCU (AFCU) 170 and a switching unit 110. It is assumed that all FCUs can access a global time with known precision. The structure of such a global time is described in detail in [6, Chapter 3]. The sensor 101 is managed by the SFCU 102, the sensor 104 is managed by the SFCU 105 and the sensor 107 is managed by the SFCU 108. At the start of a new cycle, the SFCUs 102, 105, 108 read the sensor data. Following the pre-processing of the sensor data by the corresponding SFCUs, the SFCU 102 transmits a message via a channel 103 to the switching unit 110. Similarly, the SFCU 105 transmits a message via a channel 106 and the SFCU 108 transmits a message via the channel 109 to the switching unit 110. The switching unit 110 transmits the messages at the cyclical conveying time specified beforehand in a time-controlled system to the VFCU 130 via the channel 112 and parallel thereto to the MFCU 120 via the channel 111. The switching unit 110 can be provided by a TTEthernet switch, as described in [2], [7], or by a multirouter [3]. The message contains a commitment time, which specifies the earliest moment at which the VFCU 130 may relay a result influenced by the three messages to the AFCU 170 via the channel 131. The VFCU 130 may newly describe the inner state thereof after the commitment time. Alternatively, in a time-controlled system, the commitment time associated with a message can be derived from the cyclical time schedule, determined a priori, of the FCUs and communicated a priori at the moment of the system start of the VFCU 130 and of the MFCU 120. The commitment time then does not have to be contained in the message.

Following receipt of the messages of the SFCUs 102, 105, 108, the VFCU 130 performs a sensor fusion with reference to the current inner state thereof and calculates a new result for relay to the AFCU 170 and a new inner state for the next cycle. Should these results be present before the commitment time, the output of the results by the VFCU 130 is delayed until the commitment time. Parallel to the processing of the messages of the three SFCUs 102, 105, 108 in the VFCU 130, the MFCU 120 checks whether the messages of the three SFCUs 102, 105, 108 portray an expedient image of the environment or whether one or more of the messages is/are faulty. A recognised fault is transmitted in the form of a fault message to the VFCU 130 before the commitment time via the channel 111, the switching unit 110 and the channel 112. If the VFCU receives a fault message from the MFCU 120, the VFCU 130 thus analyses the fault description contained in the message and decides whether the results calculated in this cycle have to be rejected. Should the VFCU 130 reject the results, the inner state of the VFCU remains unchanged and a new value is not relayed in this cycle to the AFCU 170 for output to the actuator 171.

In many cyclical real-time applications in the field of control engineering or in the multimedia field, the failure of a cycle is tolerated by the application. Due to the disclosed invention, a transient fault caused by the damage to the inner state of an FCU is prevented from becoming a permanent fault or from damaging the environment due to the output of a faulty result.

FIG. 2 shows an implementation of the described method by means of a multiprocessor system on chip (MPSoC). The MPSoC 200 contains the SFCUs 102, 105, 108 as IP cores. The switching unit 110 is formed as a network on chip. Besides the MFCU 120, a further MFCU 125 is provided as an IP core. The VFCU 130 is also an independent IP core. The AFCU 170, which controls the actuator 171, is implemented as a separate sub-system. The novel method can thus be implemented very efficiently on an MPSoC and uses the inherent parallelism of MPSoCs.

The disclosed method can also be implemented in the distribution unit 110. In this case the messages of the SFCUs 102, 105, 108 are relayed by the distribution unit immediately to the MFCU 120, however the relay of these messages to the VFCU 130 by the distribution unit 110 is delayed until the commitment time. If a fault message from the MFCU 120 reaches the distribution unit 110 before the commitment time, the distribution unit thus rejects the messages of the SFCUs 102, 105, 108 still present in the memory of the distribution unit. In a time-controlled system, this implementation results in the abstraction of a fail-silent sensor system, that is to say the sensor system transmits either correct messages or no messages. An alternative implementation of fail-silence, which is performed by parts of the industry, uses self-checking hardware for this purpose. The disclosed method has the advantage over self-checking hardware that it is possible to recognise not only digital hardware faults at hardware level, but additionally also the much more frequent faults of the sensors and software faults at system level.

If, besides the transient causes of faults, permanent hardware faults also have to be tolerated, the use of redundant hardware is thus necessary. The sensors, the FCUs, the switching units and the communication channels have to be designed redundantly in accordance with the specified fault hypothesis. The open method for fault recognition and fault treatment can also be applied with use of redundant hardware.

In accordance with the invention, the fault recognition in many real-time systems calls for an outlay comparative to that for processing. The clear separation and parallel arrangement of processing function and fault recognition function provides the following technical and economical advantages compared with the usual series arrangement within a single FCU:

In addition to the obvious shortening of the response time, the reliability is also improved, since the VFCUs are made smaller and a fail-silent failure of an MFCU (the dominant type of failure of the hardware) does not cause a failure of the processing function.

The likelihood for the occurrence of correlated faults is reduced and therefore reliability is increased.

The parallel arrangement of processing function and fault recognition function facilitates an implementation on an MPSoC.

The independence of the functions reduces the system complexity and therefore leads to a reduction of the development and validation costs.

The present invention describes an innovative method for parallelising the functional processing and the fault recognition in a system of systems under real-time conditions and for preventing a recognised fault from propagating into the environment. This is made possible by the introduction of a commitment time associated with a previous result. The independent fault recognition operating in parallel must signal the fault to the sub-system performing the output to the environment before the commitment time, such that a recognised fault does not lead to a false output to the environment.

CITED LITERATURE

[1] U.S. Pat. No. 5,793,753
[2] U.S. Pat. No. 7,839,868
[3] U.S. Pat. No. 8,004,993
[4] US Pat Application 20110307741
[5] US Pat Application 20050094674
[6] Kopetz, H. Real-Time Systems, Design Principles for Distributed Embedded Applications. Springer publishing house. 2011.
[7] SAE Standard of TT Ethernet. URL: http://standards.sae.org/as6802

The invention claimed is:

1. A method for fault recognition in a distributed real-time computer system comprising fault containment units (FCUs), more particularly a fault-tolerant system of systems (SoS), which has a global timebase, characterised in that
   the fault containment units communicate by means of messages via at least one message distribution unit, wherein a commitment time is associated with a message formed by a fault containment unit, and wherein a message distribution unit that receives a message relays the message to one or more fault containment units operating in parallel,
   and wherein a processing fault containment unit (VFCU) does not transmit any of its results that are influenced by one or more of the received messages to the environment of the processing fault containment unit or use the received messages for changing the inner state of the processing fault containment unit before the commitment times associated with the received messages, where the environment of the processing fault containment unit includes all receivers of messages from the processing fault containment unit.

2. The method according to claim 1, characterised in that the commitment time associated with a message is contained in the message.

3. The method according to claim 1, characterised in that the commitment time associated with a message is derived from a time-controlled time schedule, determined a priori, of the fault containment units.

4. The method according to claim 1, characterised in that a distinction is made between processing fault containment units (VFCUs) and monitor fault containment units (MFCUs), wherein the message distribution unit relays one or more messages of a sensor fault containment unit (SFCU) to one or more designated processing fault containment units and additionally to one or more monitor fault containment units, and wherein a monitor fault containment unit examines the content of the received messages and, if a fault is determined in a message, transmits a fault message to the one or more designated processing fault containment units before the commitment time associated with the message, such that the one or more designated processing fault containment units can reject all results influenced by the faulty message before the commitment time.

5. The method according to claim 1, characterised in that, in a cyclically operating real-time computer system, in particular a cyclically operating system of systems, a designated processing fault containment unit replaces a result that is rejected in a cycle due to a fault with the result of the previous cycle.

6. The method according to claim 1, characterised in that a multiplicity of fault containment units, which may take over sensor data, form messages in a cycle that have the same commitment time, wherein some or all of these messages are transmitted via one or more message distribution units to one or more processing fault containment units and to one or more monitor fault containment units, and wherein the processing fault containment units do not transmit any results that are influenced by one of these messages to the environment of a processing fault containment unit or use them for changing the inner state of a processing fault containment unit before the commitment time associated with the messages.

7. The method according to claim 1, characterised in that the distribution unit relays received messages immediately to the monitor fault containment unit, but delays the relay of the messages to the processing fault containment units until the commitment time, wherein, in the case of a recognised fault, the monitor fault containment units transmit a fault message to the distribution unit before the commitment time, such that the distribution unit can reject the faulty messages and does not relay them to the processing fault containment units.

8. The method according to claim 1, characterised in that the processing fault containment unit receiving a fault message decides, following analysis of the description of the fault contained in the fault message, whether the results will be transmitted in this cycle to the environment of the processing fault containment unit or will be used to permanently change the inner state of the processing fault containment unit.

9. A message distribution unit for conveying messages in a distributed real-time computer system, more particularly a fault-tolerant system of systems (SoS), which comprises fault containment units (FCUs) and which has a global timebase, wherein the fault containment units communicate by means of messages via the at least one message distribution unit, wherein a commitment time is associated with a message formed by a fault containment unit, and wherein a message distribution unit that receives a message relays the message to one or more fault containment units operating in parallel, characterised in that
 the message distribution unit is designed to copy an incoming message and to transmit a copy of the message immediately to a monitor fault containment unit and to delay a second copy of the message until a commitment time associated with the message before the second copy of the message is transmitted from the message distribution unit to the following processing fault containment units.

10. The message distribution unit according to claim 9, characterised in that the commitment time associated with a message is contained in the message.

11. The message distribution unit according to claim 9, characterised in that the commitment time associated with a message is derived from a time-controlled time schedule, determined a priori, of the fault containment units.

12. A distributed real-time computer system, more particularly a fault-tolerant system of systems (SoS), which comprises fault containment units (FCUs) and which has a global timebase, comprising at least one message distribution unit for conveying messages, wherein the fault containment units communicate by means of messages via the at least one message distribution unit, wherein a commitment time is associated with a message formed by a fault containment unit, and wherein a message distribution unit that receives a message relays the message to one or more fault containment units operating in parallel, characterised in that
 the message distribution unit is designed to copy an incoming message and to transmit a copy of the message immediately to a monitor fault containment unit and to delay a second copy of the message until a commitment time associated with the message before the second copy of the message is transmitted from the message distribution unit to the following processing fault containment unit.

13. The real-time computer system according to claim 12, characterised in that a distinction is made between processing fault containment units (VFCUs) and monitor fault containment units (MFCUs), wherein the message distribution unit relays one or more messages of a sensor fault containment unit (SFCU) to one or more designated processing fault containment units and additionally to one or more monitor fault containment units, and wherein a monitor fault containment unit examines the content of the received messages and, if a fault is determined in a message, transmits a fault message to the one or more designated processing fault containment units before the commitment time associated with the message, such that the one or more designated processing fault containment units can reject all results influenced by the faulty message before the commitment time.

14. The real-time computer system according to claim 12, characterised in that, in a cyclically operating real-time computer system, in particular a cyclically operating system of systems, a designated processing fault containment unit advantageously replaces a result that is rejected in a cycle due to a fault with the result of the previous cycle.

15. The real-time computer system according to claim 12, characterised in that a multiplicity of fault containment units, which may take over sensor data, form messages in a cycle that have the same commitment time, wherein some or all of these messages are transmitted via one or more message distribution units to one or more processing fault containment units and to one or more monitor fault containment units, and wherein the processing fault containment units do not transmit any results that are influenced by one of these messages to the environment of a processing fault containment unit or use them for changing the inner state of a processing fault containment unit before the commitment time associated with the messages.

16. The real-time computer system according to claim 12, characterised in that the message distribution unit relays received messages immediately to the monitor fault containment unit, but delays the relay of the messages to the processing fault containment units until the commitment time, wherein, in the case of a recognised fault, the monitor fault containment units transmit a fault message to the distribution unit before the commitment time, such that the distribution unit can reject the faulty messages and does not relay them to the processing fault containment units.

17. The real-time computer system according to claim 12, characterised in that the processing fault containment unit receiving a fault message decides, following analysis of the description of the fault contained in the fault message, whether the results will be transmitted in this cycle to the environment of the processing fault containment unit or will be used to permanently change the inner state of the processing fault containment unit.

18. The real-time computer system according to claim 12, characterised in that the monitor fault containment unit checks the content of the message immediately and transmits a fault message to the message distribution unit in the case of a fault recognition before the commitment time, and the message distribution unit rejects a faulty message before the faulty message is transmitted by the switching unit to the designated processing fault containment unit.

\* \* \* \* \*